US010732992B2

(12) United States Patent
Becotte, IV et al.

(10) Patent No.: US 10,732,992 B2
(45) Date of Patent: Aug. 4, 2020

(54) GENERATING DYNAMIC LINKS FOR NETWORK-ACCESSIBLE CONTENT

(71) Applicant: The Narrativ Company, Inc., New York, NY (US)

(72) Inventors: Paul Norman Becotte, IV, Medford, NJ (US); Christopher Ho Sang, Forest Hills, NY (US); Shirley Chen, New York, NY (US)

(73) Assignee: The Narrativ Company, Inc., New York, NY (US)

( * ) Notice: Subject to any disclaimer, the term of this patent is extended or adjusted under 35 U.S.C. 154(b) by 373 days.

(21) Appl. No.: 15/880,411

(22) Filed: Jan. 25, 2018

(65) Prior Publication Data

US 2018/0365034 A1 Dec. 20, 2018

Related U.S. Application Data

(60) Provisional application No. 62/521,790, filed on Jun. 19, 2017.

(51) Int. Cl.
*G06F 9/445* (2018.01)
*G06F 16/958* (2019.01)
*H04N 21/2743* (2011.01)
*G06F 16/44* (2019.01)

(52) U.S. Cl.
CPC ........ *G06F 9/44521* (2013.01); *G06F 16/972* (2019.01); *G06F 16/447* (2019.01); *H04N 21/2743* (2013.01)

(58) Field of Classification Search
CPC ........................... G06F 9/44521; G06F 16/972
USPC ........................................................ 707/769
See application file for complete search history.

(56) References Cited

U.S. PATENT DOCUMENTS

| 6,571,282 B1* | 5/2003 | Bowman-Amuah ....................... H04L 67/303 709/219 |
| 6,839,757 B1* | 1/2005 | Romano ................. H04L 67/16 709/226 |
| 6,909,708 B1* | 6/2005 | Krishnaswamy ... H04L 12/1813 370/352 |
| 2004/0107125 A1* | 6/2004 | Guheen .................. G06Q 50/01 705/319 |

(Continued)

OTHER PUBLICATIONS

Viglink.com [online], "Transform existing product links into valuable marketing traffic", retrieved Jun. 2018, (1 page).

(Continued)

*Primary Examiner* — Dung K Chau
(74) *Attorney, Agent, or Firm* — Fish & Richardson P.C.

(57) ABSTRACT

In an example method, a request for a dynamic access link is received from a first device. The request includes data identifying a first network resource. A subject associated with the first network resource is identified, and one or more additional network resources pertaining to the subject are determined. The dynamic access link is determined, and the dynamic access link is provided to the first device. A network resource access request is received from a second device. The network resource access request is generated responsive to the dynamic access link being selected. Responsive to receiving the network resource access request, at least one of the first resource or the one or more additional network resources is chosen, and a network address of the chosen resource is provided to the second device.

20 Claims, 10 Drawing Sheets

(56) References Cited

U.S. PATENT DOCUMENTS

2014/0067702 A1* 3/2014 Rathod .................. G06Q 10/10
    705/319
2016/0216946 A1* 7/2016 Bordeau ................. G06F 8/315
2017/0223046 A1* 8/2017 Singh .................... H04L 43/062

OTHER PUBLICATIONS

Skimlinks.com [online], "Getting started Skimlinks Beginners' Guide", retrieved Jun. 2018, (18 pages).

* cited by examiner

Original outbound links

| | | | | |
|---|---|---|---|---|
| movietrailers.com/moviename/trailers/ 🔍 | | | | |
| Total: 1 | Status | Publisher | Edit | Date |
| http:movietrailers.com/moviename/trailers/ | Selected | Well Known | Hit Movies | 2/28/17 |

Additional destination sites matched

| | | | | |
|---|---|---|---|---|
| Search | | | | |
| Image | Title | Category | Retailer | Match |
| ☐ | Trailer 1<br>Movie Name | Trailer | Trailer Site 1 | ❯ |
| ☐ | Clip<br>Movie Name | Trailer | Trailer Site 2 | ❯ |
| ☐ | Trailer 1<br>Movie Name | Trailer | Trailer Site 3 | ❯ |
| ☐ | Movie<br>Movie Name | Ticketing | Ticketing Site 1 | ❯ |
| ☐ | Movie<br>Preview, buy, and<br>download this movie. | On Demand | On Demand 1 | ❯ |
| ☐ | Movie<br>Preview, buy, and<br>download this movie. | On Demand | On Demand 2 | ❯ |

SMART LINK MATCH CENTER    ADMIN ˅

GENERATING DYNAMIC LINKS FOR NETWORK-ACCESSIBLE CONTENT

TECHNICAL FIELD

The disclosure relates to generating dynamic links for network-accessible content.

BACKGROUND

Content providers can publish content using a communications network (e.g., the Internet). As an example, a content provider can write an article, and publish the article as an Internet-accessible website. In turn, content consumers (e.g., a reader) can retrieve the website to review the published content.

In some cases, content providers can create links to other content on the network, such that users are redirected to other content on the network. For example, a content provider can publish a webpage, and include in the webpage a hyperlink specifying a particular destination on the network (e.g., a network address, such as a uniform resource locator [URL], that specifies another webpage on the Internet). Content consumers can select the hyperlink to access the specified content.

SUMMARY

In general, a dynamic link platform can dynamically alter the destination of a link (e.g., a URL) based on various selection criteria. Destinations can include resources that can be retrieved over a network, such as webpages, text, images, video, animations, or other content stored on a network and made available to one or more users of the network.

In some cases, a dynamic link platform system can dynamically determine a destination of a link "on click." For instance, a publisher can generate a dynamic link and insert the generated dynamic link into published content (e.g., a web page). When a user accesses the published content using his browser and selects a dynamic link (e.g., "clicks" on the dynamic link), the user's browser is directed to a dynamic link platform. The dynamic link platform selects a destination from among a number of candidate destinations (e.g., by conducting an auction), and redirects the user's browser to the selected destination. Thus, a destination page is selected by the dynamic link platform when the user selects or "clicks" a dynamic link.

In some cases, a candidate destination can be selected "on impression." For example, a publisher can insert executable code into published content (e.g., include a portion of JavaScript code in the markup of a web page). Further, the publisher can include a "traditional" static link in the published content (e.g., include a static link identifying a particular proposed destination web page). When a user accesses the published content using his browser, the browser automatically executes the executable code (e.g., upon loading of the web page). Upon execution of the executable code, the user's browser identifies the static link in the published content, and transmits the static link to the dynamic link platform. The dynamic link platform retrieves content from the destination identified by the static link, determines one or more candidate destinations, and selects a destination from among the candidate destinations (e.g., in a similar amend as described above). Upon selecting a destination, the dynamic link transmits the address of the selected destination to the user's browser. Upon receiving the selected destination, the user's browser automatically replaces the static link with a new link identifying the selected destination, without requiring any action on the part of the user. When the user selects the new link, the user is directed to the selected destination. Thus, a destination page is selected by the dynamic link platform when the user first accesses the published content (e.g., "on impression" of the published content), rather than when the user selects or "clicks" on a particular link.

In an example method, a request for a dynamic access link is received from a first device. The request includes data identifying a first network resource. A subject associated with the first network resource is identified. One or more additional network resources pertaining to the subject are determined. The dynamic access link is determined, and the dynamic access link is provided to the first device. A network resource access request is received from a second device. The network resource access request is generated responsive to the dynamic access link being selected. Responsive to receiving the network resource access request, at least one of the first resource or the one or more additional network resources is chosen. A network address of the chosen resource is provided to the second device.

Implementations of this method can include one or more of the following features.

In some implementations, the first network resource can be a webpage, and the subject can be a product.

In some implementations, choosing at least one of the first network resource or the one or more additional network resources can include receiving one or more bids from one or more entities associated with the first network resource or the one or more additional network resources, and choosing at least one of the first network resource or the one or more additional network resources based on the one or more bids.

In some implementations, the one or more bids can be received subsequent to generating the dynamic access link and providing the dynamic access link to the first device.

In some implementations, the one or more bids can be received prior to receiving the network resource access request from the second device.

In some implementations, the dynamic access link can be a uniform resource locator.

In some implementations, the dynamic access link can include a first sequence of alphanumeric characters common to one or more additional dynamic access links, and a second sequence of alphanumeric characters unique to the dynamic access link with respect to the one or more additional dynamic access links.

In some implementations, the method can further include storing, in an electronic database, the second sequence of alphanumeric characters, an indication of the subject, and an indication of an association between the second sequence of alphanumeric characters and the subject.

In some implementations, the subject can be a product. The method can further include determining one or more characteristics of the product based on the first network resource, and storing, in the electronic database, the one or more characteristics of the product.

In some implementations, the one or more characteristics of the product can include a product specification associated with the product.

In some implementations, choosing at least one of the first network resource or the one or more additional network resources can include determining an absence of a valid bid from entities associated with the first network resource or the one or more additional network resources with respect to the dynamic access link, and responsive to determining the absence of a valid bid, randomly choosing at least one of the first network resource or the one or more additional network resources.

In some implementations, choosing at least one of the first network resource or the one or more additional network resources can include determining that at least one of: the first network resource is unavailable, at least one of the one or more additional network resources is unavailable, content from the first network resource is unavailable, or content from at least one of the one or more additional network resource is unavailable. Choosing at least one of the first network resource or the one or more additional network resources can also include choosing at least one of the first network resource or the one or more additional network resources in based on determining that at least one of the first network resource is unavailable, at least one of the one or more additional network resources is unavailable, content from the first network resource is unavailable, or content from at least one of the one or more additional network resource is unavailable.

In some implementations, determining that at least one of the first network resource is unavailable, at least one of the one or more additional network resources is unavailable, content from the first network resource is unavailable, or content from at least one of the one or more additional network resource is unavailable can include determining that a particular network resources cannot be accessed through a communications network using. Choosing at least one of the first network resource or the one or more additional network resources can include excluding the particular webpage from being chosen.

In some implementations, the request for the dynamic access link can be generated by a browser extension application of the first device.

In some implementations, the request for the dynamic access link can be generated by the browser extension application of the first device responsive to a user retrieving the first network resource using a browser of the first device and inputting a command to generate the request to the browser extension application.

In some implementations, the first network resource can include a sales offer for a product. The one or more additional network resources can include one or more additional webpages. Each additional webpage can include a respective sales offer for the product.

In some implementations, choosing at least one of the first network resource or the one or more additional network resources can include determining, based on the webpage and the one or more additional webpages, an availability of the product from one or more entities associated with the first network resource or the one or more additional network resources, and choosing at least one of the first network resource or the one or more additional network resources based on the determined availability of the product.

In some implementations, determining the availability of the product can include determining that the product is unavailable from a particular entity associated with the first network resource or the one or more additional network resources. Choosing at least one of the first network resource or the one or more additional network resources can include excluding the first network resource or the one or more additional network resources associated with the particular entity from being chosen.

An example non-transitory computer-readable medium includes one or more sequences of instructions which, when executed by one or more processors, causes receiving, from a first device, a request for a dynamic access link. The request includes data identifying a first network resource. The one or more sequences of instructions, when executed by one or more processors, also causes identifying a subject associated with the first network resource, determining one or more additional network resources pertaining to the subject, generating the dynamic access link and providing the dynamic access link to the first device, and receiving, from a second device, a network resource access request. The network resource access request is generated responsive to the dynamic access link being selected. The one or more sequences of instructions, when executed by one or more processors, also causes responsive to receiving the network resource access request, choosing at least one of the first resource or the one or more additional network resources, and providing a network address of the chosen resource to the second device.

An example system includes one or more processors, and a non-transitory computer-readable medium including one or more sequences of instructions. The one or more sequences of instructions, when executed by one or more processors, causes receiving, from a first device, a request for a dynamic access link. The request includes data identifying a first network resource. The one or more sequences of instructions, when executed by one or more processors, also causes identifying a subject associated with the first network resource, determining one or more additional network resources pertaining to the subject, generating the dynamic access link and providing the dynamic access link to the first device, and receiving, from a second device, a network resource access request. The network resource access request is generated responsive to the dynamic access link being selected. The one or more sequences of instructions, when executed by one or more processors, also causes, responsive to receiving the network resource access request, choosing at least one of the first resource or the one or more additional network resources, and providing a network address of the chosen resource to the second device.

One or the more of the implementations described herein can provide various benefits. For example, in some cases, a dynamic link platform enables content providers to keep link destinations up-to-date and pointing to active and relevant webpages automatically, without requiring the content providers to manually review and reconfigure links that may be associated with inactive webpages. Thus, requests to access webpages are less likely to fail, thereby improving the efficiency and performance of a communications network. Additionally, a dynamic link platform enables content providers to retain active editorial control over the content associated with a dynamically linked destination. Thus, the quality and relevance of linked content is improved.

The details of one or more embodiments are set forth in the accompanying drawings and the description below. Other features and advantages will be apparent from the description and drawings, and from the claims.

DESCRIPTION OF DRAWINGS

FIGS. 4A-4F show example user interfaces for generating and using dynamic links.

DETAILED DESCRIPTION

Figure 1:
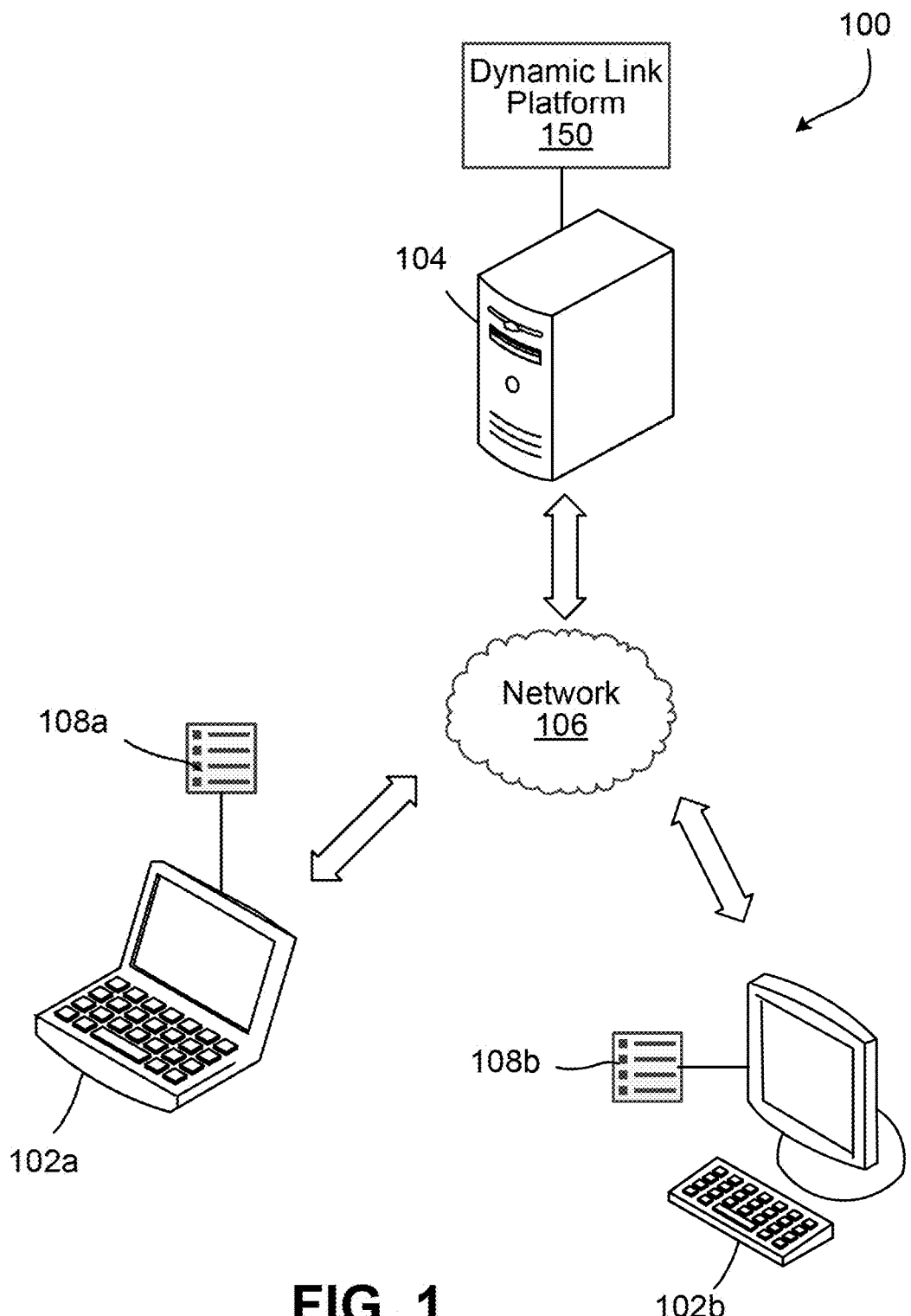
FIG. 1 is a diagram of an example system for generating dynamic links.

In general, a dynamic link platform dynamically alters the destination of a link (e.g., a URL) based on various selection criteria. Destinations can include resources that can be retrieved over a network, such as webpages, text, images, video, animations, or other content stored on a network and made available to one or more users of the network.

Implementations of the dynamic link platform enable content providers to keep link destinations up-to-date and pointing to active and relevant webpages automatically, without requiring the content providers to manually review and reconfigure links that may be associated with inactive webpages. Additionally, in contrast to banner ad systems that update advertisements based on factors outside of a content provider's control, the dynamic link platform enables the content provider to retain active editorial control over the content associated with the dynamically linked destination.

In an example implementation, a content provider identifies a particular item to disclose, write about or review in an online publication. This can include, for instance, an article of clothing, a product, an event, a data file (e.g., a document, an audio file or a video file), or other item to be discussed in an online publication. Using the dynamic link platform, the content provider creates a dynamic link, associates the link with a proposed destination page directed to the item (through, e.g., a web resource, such as a URL, that identifies the destination page), and publishes the dynamic link in an online publication. From the destination page, the dynamic link platform identifies (e.g., automatically identifies) other candidate destination pages directed to the item. The other candidate destination pages can include, for example, other merchants that sell the same article of clothing or product, or other webpages publishing information about the same event or hosting the same file. When a content consumer (e.g., a reader of the online publication) accesses the dynamic link, the dynamic link platform automatically chooses a destination page from among the candidate destination pages, and redirects the content consumer to the chosen destination page.

In some cases, the dynamic link platform can choose a destination page to be associated with a dynamic link through an electronic auction (e.g., an auction between merchants or other entities vying to be chosen as the destination page). In some cases, the dynamic link platform can choose a destination page to be associated with a dynamic link based on specific rules defining how destination pages are chosen. These rules can be based on various factors, such as a popularity of the destination page and/or the relevance of the destination page to the subject matter of the online publication. In some cases, one or more rules can specify that the destination page to be associated with the dynamic link may be chosen based on factors relevant to the consumer who has accessed the link. For instance, the destination page may be chosen based on a browsing history, a purchase history, or other consumer-specific factors. As an example, if the browsing history from a web browser used to access the dynamic link includes information indicative of a preference for visiting a webpage associated with a particular merchant, the destination page may be selected to match that merchant's webpage. As another example, if the purchase history associated with a particular user includes information indicative of a preference for making purchases from a particular merchant, the destination page may be chosen to match that merchant's webpage. Browsing histories and purchase histories can be obtained, for example, by recording the webpages accessed by a web browser and/or a user's interactions with one or more webpages. In some cases, one or more rules can specify that the dynamic link platform can choose or not choose a destination page to be associated with a dynamic link based on characteristics of the candidate destination pages. For example, if content cannot be retrieved from a candidate destination or the candidate destination page is no longer available (e.g., a candidate webpage no longer exists or the content of the candidate webpage is no longer directed to the originally identified item), the candidate destination page can be excluded from consideration. These rules can provides various technical benefits. For example, these rules can enable the dynamic link platform to perform tasks that might otherwise require the manual intervention of a user (e.g., selecting a suitable destination page from one or more candidate webpages). As another example, these rules can enable the dynamic link platform to reduce or eliminate "link rot" (e.g., the process where hyperlinks point to destination pages, servers or other resources that have become essentially permanently unavailable). For instance, due to the operation of the dynamic link, requests to access webpages can be made less likely to fail, thereby improving the efficiency and performance of a communications network.

In some cases, the dynamic link platform can choose a destination page based on one or more criteria specified by the content provider. For instance, a content provider can specify one or more candidate merchants from which the dynamic link platform can choose a destination page. This can be useful, as it enables the content provider to control which external content is associated with the content provider's content.

As an example, a content provider writing an online article about a product (e.g., an article discussing the content provider's impressions of the product) wishes to include a dynamic link to the product in the article, such that readers can purchase the product from a merchant. However, the content provider wishes the online article to be associated only with a particular pre-defined collection of merchants. For instance, the content provider may have pre-existing relationships with those particular merchants, may find those particular merchants more trustworthy than others, may find the character or style associated with those particular merchants consistent with the content of the online article, or may otherwise prefer those merchants over others. Accordingly, the content provider can specify that the dynamic link platform choose a destination only from among those particular pre-defined collection of merchants. When a reader accesses the dynamic link, the dynamic link platform automatically chooses a destination page from among the specified candidate merchants, and redirects the reader to the destination page.

Further, although the dynamic link platform chooses a destination page, the chosen destination page is not statically associated with the dynamic link. Rather, the destination page can change. For instance, the destination page could potentially change each time the dynamic link is selected by a reader. For example, if a first reader selects the dynamic link at a first time, the dynamic link platform can redirect the first reader to a first destination page based on the content provider's specifications. Further, when a second reader selects the dynamic link at a second time, the dynamic link platform can redirect the second reader to a second destination page based on the content provider's specifications.

For example, if the first reader again selects the dynamic link at a third time, the dynamic link platform can redirect the first reader to a third destination page based on the content provider's specifications. Thus, the dynamic link platform keeps link destinations up-to-date and pointing to active and relevant webpages automatically, while the content provider retains editorial control over the destinations.

In some cases, the dynamic link platform can also choose a destination page based on the nature of the content. As an example, a content provider writing an online article about a movie wishes to include a dynamic link to the movie in the article, such that readers can obtain more information about the movie. However, the availability of the movie may change over time. Accordingly, readers may be interested in different types of information over time. For instance, prior to the movie's general release, readers may be interested in viewing previews of the movie (e.g., movie "trailers"). Once the movie is released, readers may be interested in identifying theaters that are showing the movie and/or purchasing tickets to view the movie. Further, once the movie has been released for individual purchase or rental (e.g., released on DVD, Blu-Ray, Internet streaming services, etc.), readers may be interested in identifying stores and/or services from which they can view the movie. Accordingly, the dynamic link platform can choose a different destination page (e.g., a webpage representing a movie trailer, a webpage identifying theaters showing a movie and/or offering tickets for sale, or a webpage offering a movie for individual purchase and/or rental) dynamically over time, without requiring that the content provider manually change the destination of the dynamic link. Thus, the dynamic link platform keeps link destinations up-to-date and pointing to active and relevant webpages automatically Accordingly, the subject matter of the present disclosure covers systems for generating links, such as hypertext transfer protocol address links, that can be associated with one of multiple outbound targets (e.g., a predetermined list of webpages), in which the ultimate outbound target to which the link directs a user may be changed upon a user action (e.g., by clicking the link). In contrast, other technologies for generating and/or providing links to a user rely on associating the link with a single outbound destination. For instance, with respect to link shortening services, the characters used to represent a link may change, but the destination itself does not change. Furthermore, the links generated using the systems covered by the present disclosure can be, in some implementations, loaded across different platforms without platform-dependent restrictions. For instance, with traditional display and banner advertisements, the object (e.g., an advertisement) functioning as the link may need to be loaded into a fixed container in a fixed location on a page and delivered by a particular ad server according to predetermined business rules. In contrast, the links provided by the presently disclosed systems can be loaded across platforms (e.g., mobile vs. desktop platforms) without requiring the presence of platform-specific features (e.g., a particular-sized or located container) within the page for the link to be loaded. In some implementations, an additional benefit of dynamic links is that the advertisements generated in response to accessing the dynamic link are not ad-blocked given that the auction is triggered responsive to the user clicking the link and runs on a remote server.

FIG. 1 shows an example system 100 for generating dynamic links. The system 100 includes client systems 102a and 102b, a server system 104, and a network 106.

A dynamic link platform 150 is maintained on the server system 104. The server system 104 can be any electronic device that receives, processes, and transmits data. Examples of a server system 104 include server computers, distributed computing networks, or other systems capable of transmitting and receiving data via the network 106. A server system 104 can include devices that operate using one or more operating systems (e.g., Microsoft Windows, Apple OSX, Linux, Unix, Android, Apple iOS, etc.) and/or architectures (e.g., x86, PowerPC, ARM, etc.).

The server system 104 is communicatively connected to the client systems 102a and 102b through the network 106. A client system 102a or 102b can be any electronic device that is used by a user to view, process, transmit and receive data. Examples of client system 102a and 102b include computers (such as desktop computers, notebook computers, server systems, etc.), mobile computing devices (such as cellular phones, smartphones, tablets, personal data assistants, notebook computers with networking capability), and other computing devices capable of transmitting and receiving data from the network 106. The client systems 102a and 102b also can include devices that operate using one or more operating systems and/or architectures. In some implementations, one or more of the client systems 102a and 102b need not be located locally with respect to the rest of the system 100, and one or more of the client systems 102a and 102b can be located in one or more remote physical locations.

Each client system 102a and 102b includes a respective user interface 108a and 108b. Users can interact with the user interfaces 108a and 108b to view data (e.g., data on the server system 102 and the platform 150 and/or data on the client systems 102a and 102b). Users can also interact with the user interfaces 108a and 108b to transmit data to other devices (e.g., to the server system 102 and the platform 150 and/or to the other client systems 102a and 102b). Users can interact with the user interfaces 108a and 108b to issue commands (e.g., to the server system 102 and the platform 150 and/or to the client systems 102a and 102b). In some implementations, a user can install a software application onto a client system 102a or 102b to facilitate performance of these tasks.

The network 106 can be any communications network through which data can be transferred and shared. For example, the network 106 can be a local area network (LAN) or a wide-area network (WAN), such as the Internet. The network 106 can be implemented using various networking interfaces, for instance wireless networking interfaces (such as Wi-Fi, Bluetooth, or infrared) or wired networking interfaces (such as Ethernet or serial connection). The network 106 also can include combinations of more than one network, and can be implemented using one or more networking interfaces.

Figure 2:
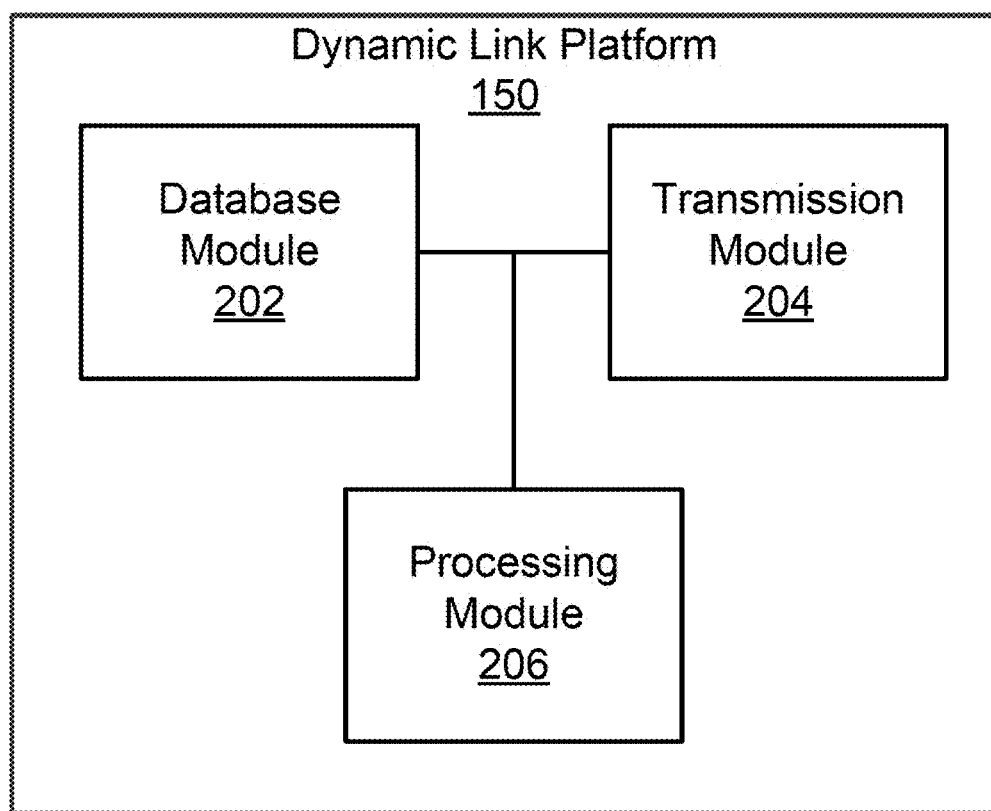
FIG. 2 is a diagram of an example dynamic link platform.

FIG. 2 shows various aspects of the platform 150. The platform 150 includes several modules that perform particular functions related to the operation of the system 100. For example, the platform 150 can include a database module 202, a transmission module 204, and a processing module 206.

The database module 202 maintains information related to one or more user accounts held by users of the system 100. As an example, the database module 202 can store information regarding a user's credentials for accessing the accounts (e.g., user name and password) and contact information for each account (e.g., e-mail address, physical address, phone number, and so forth).

Further, the database module 202 can store information regarding one or more dynamic links generated and maintained by the system 100. A dynamic link can be, for example, a link having a fixed address (e.g., the network address of the platform 150), but where the ultimate destination to which an application (e.g., a browser) is directed upon accessing the link may change depending on select criteria. For each dynamic link, the database module 202 can store, for example, an identifier uniquely identifying the dynamic link (e.g., a unique URL), a user who generated the dynamic link, one or more candidate destinations for the dynamic link, and one or more selection criteria for choosing a destination from among the candidate destinations.

Further, the database module 202 can store information regarding one or more users of the platform 150 who are seeking to be chosen as destinations of the dynamic links (e.g., through an electronic auction conducted by the dynamic link platform 150). For example, the database module 202 can store identifying information for each user participating in the bidding process, submitted bids from one or more users, bidding strategies defined by one or more users, and so forth.

The transmission module 204 allows for the transmission of data to and from the platform 150. For example, the transmission module 204 can be communicatively connected to the network 106, such that it can transmit data to the client systems 102a and 102b, and receive data from the client systems 102a and 102b via the network 106. As an example, information inputted by users on the client systems 102a and 102b can be transmitted to the platform 150 through the transmission module 204. This information can then be processed (e.g., using the processing module 206) and/or stored (e.g., using the database module 202). As another example, information from the platform 150 (e.g., information stored on the database module 202) can be transmitted to one or more of the client systems 102a and 102b through transmission module 204. Examples of transmission modules include an input/output device 540 shown in FIG. 5.

The processing module 206 processes data stored or otherwise accessible to the platform 150. For instance, the processing module 206 can execute automated or user-initiated processes that manipulate data pertaining to one or more users. As an example, the processing module 206 can manipulate data stored on the database module 202, or data that is received from the transmission module 204. Likewise, processed data from the processing module 206 can be stored on the database module 202 and/or sent to the transmission module 204 for transmission to other devices. Example processes that can be performed by the processing module 206 are described in greater detail below.

Figure 3:
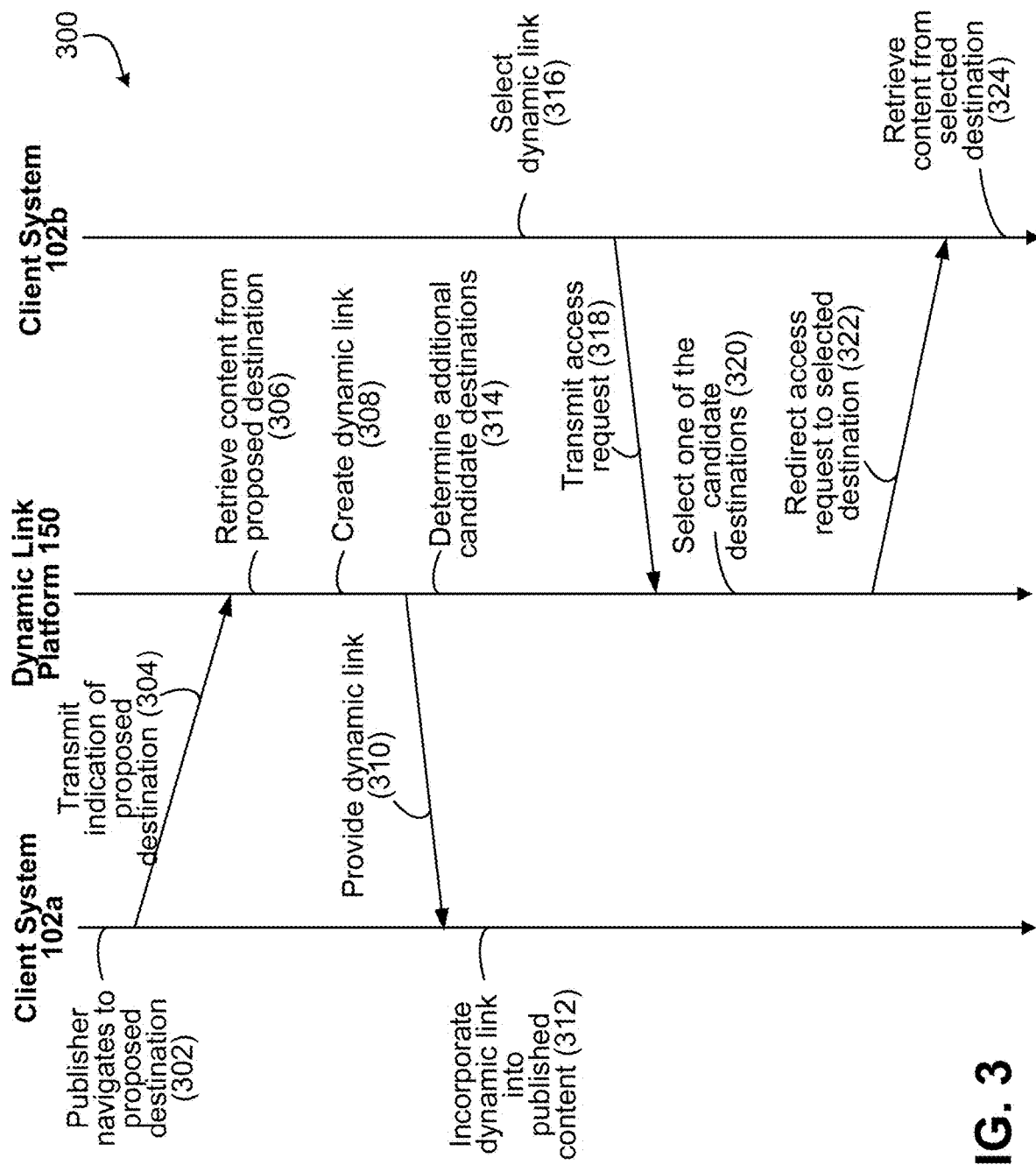
FIG. 3 is a diagram of an example process for generating a dynamic link.

FIG. 3 shows an example process 300 for generating a dynamic link using the system 100. The process 300 can be performed, for example, by processing module 206 to generate dynamic links for inclusion in network-accessible content, such as webpages.

In this example, a content provider prepares an article regarding a particular product (e.g., a particular article of clothing). To assist the article's readers in locating and purchasing the product, the content provider wishes to include a dynamic link directing the readers to a merchant offering the product for sale.

The content provider navigates to a proposed destination page using the client system 102a (step 302). The proposed destination page can be, for example, a webpage maintained by a merchant offering the product for sale. In some cases, the content provider uses a web browser installed on the client system 102a to access the proposed destination page.

The content provider subsequently transmits an indication of the proposed destination page to the dynamic link platform 150 (step 304). In some cases, the indication can include a URL identifying the proposed destination page (e.g., a URL identifying a specific webpage offering the product for sale). In some cases, the content provider manually provides the indication of the proposed destination page to the dynamic link platform 150 (e.g., by manually specifying the URL to the dynamic link platform 150). In some cases, the indication of the proposed destination page can be provided semi-automatically. For example, the content provider can select a "submit" command provided by the web browser or other application, such as a web browser "add on" or "extension" application. In some cases, the indication of the proposed destination can be provided automatically. For example, the indication can be transmitted to the dynamic link platform 150 without the content provider's input.

The dynamic link platform 150 receives the indication of the proposed destination page, and retrieves content from the proposed destination page (step 306). For example, if the proposed destination is a webpage, the dynamic link platform 150 can retrieve one or more content items on the webpage, such as text, images, video, audio, animations, or other content items. In some cases, the dynamic link platform 150 can "scrape" content from the proposed destination page (e.g., extract content from the proposed destination based on known information regarding the layout and arrangement of the content). For instance, the dynamic link platform 150 can extract information such as the identity of the entity maintaining the destination content (e.g., the name of a merchant), the identity of the product described by destination content (e.g., the name, serial number, or model number of the product), specifications of the product (e.g., features or other details regarding the product), a price of the product advertised at the destination, the availability of the product (e.g., whether the product is in stock, or the remaining units of the product that are still available for purchase), and so forth. The dynamic link platform 150 can store the retrieved content (e.g., using the database module 202).

In some cases, the dynamic link platform 150 can retrieve one or more content items on the webpage from the client system 102a. For example, the client system 102a can scrape content from the proposed destination page, and transmit some or all of the scraped content to the dynamic link platform 150. Subsequently, the dynamic link platform 150 can store the retrieved content (e.g., using the database module 202). In some cases, the client system 102a can scrape content using a web browser or other application, such as a web browser "add on" or "extension" application.

The dynamic link platform 150 generates a dynamic link based on the retrieved information (step 308). As an example, the dynamic link platform 150 can create a unique hyperlink having the dynamic link platform 150 as the proposed destination page. For instance, the dynamic link platform 150 can generate a hyperlink having a unique alphanumeric identifier sequence. The hyperlink can also have an alphanumeric sequence common to two or more dynamic access links. As an example, the hyperlink can be a "shortened URL," such as "example.com/12345," where "example.com/" is common to multiple different dynamic access links generated by the dynamic link platform 150, and "12345" is unique to a particular of the dynamic access links. In some cases, the alphanumeric sequence common to the two more dynamic access links can indicate a particular network address associated with the dynamic link platform 150. The dynamic link platform 150 also associates the dynamic link with the content retrieved from the proposed destination page. For example, the dynamic link platform 150 can store, in the database module 202, a record that includes an indication of the dynamic link (e.g., a copy of the URL and/or the identifier sequence), and information that has been extracted from the proposed destination page, such as the identity of the entity maintaining the website, the identity of the product described on the website, a price of the product, specifications of the product, the availability of the product, and so forth. In some cases, the database module 202 can store multiple records for multiple dynamic links. As an example, the database module 202 can generate a table, with each entry (e.g., each row) corresponding to a different dynamic link and each field (e.g., each column) corresponding to a different item of information obtained from the proposed candidate page.

The dynamic link platform 150 provides the generated dynamic link to the content provider via the client system 102a (step 310). In turn, the content provider can incorporate the dynamic link into published content (step 312). For example, the content provider can add the dynamic link in the source code or markup for an online article, such that readers of the online article can access additional resources relevant to the online article.

The dynamic link platform 150 further identifies one or more additional candidate destinations for the dynamic link (step 314). For example, based on the information retrieved from the user-identified proposed destination page, the dynamic link platform 150 can identify one or more other candidate destination pages that are conceptually similar to the user-identified proposed destination page, or otherwise relevant to the user-identified proposed destination page. For example, if the user-identified proposed destination page is a merchant's webpage offering a particular product for sale, the dynamic link platform 150 can identify one or more additional webpages (e.g., maintained by one or more other merchants), each offering the same product for sale.

In some cases, the dynamic link platform 150 can identify the additional candidate destination pages automatically. For example, the dynamic link platform 150 can automatically retrieve content from one or more webpages, and index the webpages according to their content (e.g., an index describing the subject matter of the webpage). The generated index can be stored, for instance, in the database module 202. As an example, for each webpage, the dynamic link platform 150 can automatically determine the specific product or item being described by the webpage, and update a previously generated and stored index based on the determination. Relevant candidate webpages can be identified based on this index. For example, the index can be used to identify webpages having similar content as the proposed destination page.

In some cases, the dynamic link platform 150 can identify additional candidate destination pages based on one or more previously identified candidate destination pages. For example, once the dynamic link platform 150 has identified a first candidate destination page, the dynamic link platform 150 can identify one or more additional items (e.g., products) that have historically been matched to the same candidate page. Subsequently, the dynamic link platform 150 can use the recorded attributes of the additional items to generate search queries that will return a list of possible candidate pages based on relevance scores. Further, the dynamic link platform 150 can filter a list of candidate pages using deep learning (e.g., to identify other candidate pages that are likely to be directed to the same item or items).

In some cases, the dynamic link platform 150 can automatically retrieve additional content from one or more webpages and index that content over time. For example, the dynamic link platform 150 can continuously, periodically, or intermittently "crawl" a network, such as the Internet, for content, and update a previously generated and stored index based on any or new or updated information that was retrieved.

In some cases, candidate destination pages can be identified manually by a user. For example, an administrator of the dynamic link platform 150 can manually identify additional candidate destination pages that are relevant to a particular product or item, and update an index to reflect the identified pages.

In some cases, the dynamic link platform 150 can identify the additional candidate destination pages semi-automatically. For example, an administrator of the dynamic link platform 150 can specify one or more websites from which the dynamic link platform 150 retrieves content. After the dynamic link platform 150 retrieves and indexes content from the websites, the administrator can review and edit the index (e.g., to correct errors in the index, supplement the information in the index, and so forth).

In some cases, candidate destination pages can be identified based on the content provider's specifications. As an example, the content provider may wish that an online article be associated only with a particular pre-defined collection of merchants. For instance, the content provider may have pre-existing relationships with those particular merchants, may find those particular merchants more trustworthy than others, may find the character or style associated with those particular merchants consistent with the content of the online article, or may otherwise prefer those merchants over others. Accordingly, the content provider can specify that candidate destination pages include only webpages from a pre-defined collection of merchants (e.g., such that a destination page is chosen from a pre-defined "whitelist"). In some cases, a content provider can specify that one or more webpages or websites be excluded as candidate destination pages (e.g., such that certain destination pages are "blacklisted").

After the dynamic link is publicized in online content (e.g., incorporated in an online article), one or more readers of the content can select the dynamic link to access relevant content. For instance, a reader can select the dynamic link using a client system 102b (step 316). As an example, the reader can select the dynamic link using a web browser (e.g., by clicking on the dynamic link displayed in the content).

Upon selection of the dynamic link, an access request is transmitted from the client system 102b to the dynamic link platform 150 (step 318). In some cases, an access request can include an indication of the selected dynamic link (e.g., a Hypertext Transfer Protocol (HTTP) "GET" command specifying the URL of the dynamic link). In some cases, an access request can include an indication of the user and/or the web browser associated with the request (e.g., a "cookie" file identifying the user and/or the web browser, a browsing history of the user and/or the web browser with respect to one or more webpages, and so forth).

In response to receiving the access request, the dynamic link platform 150 chooses one of the candidate destinations to fulfill the request (step 320). In some cases, the dynamic link platform 150 can choose one of the candidate destinations automatically. For instance, the dynamic link platform 150 can retrieve a record of the selected dynamic link from the database module 202, and based on the retrieved record, determine the subject matter of the destination page proposed by the content provider. Based on this information, the dynamic link platform 150 can search the webpage index stored in the database module 202 to identify one or more candidate webpages directed to similar subject matter as the proposed destination page. One of the candidate webpages can be chosen based on the search.

In some cases, the dynamic link platform 150 can choose one of the candidate destination pages in real-time or substantially real-time. In some cases, a choice can be made within 100 milliseconds or less, or within some other period of time after receiving the request.

In some cases, the dynamic link platform 150 can choose a destination through an electronic auction. For instance, the dynamic link platform 150 can conduct an electronic auction between merchants or other entities vying to be chosen as the destination page.

In some cases, each of the participants in the auction can submit a bid (e.g., a monetary bid) to be chosen as the destination page. The dynamic link platform 150 can review each of the bids, and choose one of the participants based upon their bids (e.g., by choosing the participant with the highest bid, or otherwise favoring the participant with the highest bid). In some cases, the bids can be prepared and/or submitted prior to the reader selecting the dynamic link, such that the auction can be conducted quickly after the user selects the dynamic link. For instance, the bids can be prepared and/or submitted upon generation of the dynamic link by the platform 150.

In some cases, each of the participants in the auction can submit a bidding profile to be chosen as the destination. The bidding profiles enables each participant to automatically submit bids for auctions in accordance with particular bidding parameters defined by the participants. For example, a bidding profile can include bidding parameters defined by a participant, such as the total amount of funds that the participant wishes to make available across one or more auctions, a bidding ceiling defining the maximum amount that the participant wishes to bid in an auction, a pricing strategy, publisher-level targeting parameters, product-level targeting parameters, and so forth. Based on the bidding profiles, the dynamic link platform 150 can automatically determine an appropriate bid for each of the participants, and select the winner of the auction. In some cases, the bidding profiles can be prepared and/or submitted prior to the reader selecting the dynamic link, such that the auction can be conducted quickly after the user selects the dynamic link.

In some cases, the dynamic link platform can estimate a predicted "click value" based on historical data. "Click value" could represent, for example, how much money a particular user is predicted to spend on the website, multiplied by how often that the user is predicted to make a purchase. Several factors can be considered in making this determination, such as the entity associated with the destination page, the content provider, the purchase history of the user, demographic information regarding the user, and so forth.

Once the dynamic link platform 150 has determined a predicted value for the click, the dynamic link platform 150 can apply the participant's strategy. Several factors can be considered, including a target return on investment (ROI) of the participant, and "pacing." To illustrate, if participant hopes to make $5 for every $1 that they spend on the dynamic link platform 150 (e.g., a target ROI of $5 for every $1 spent), the expected click value can be divided by 5 to calculate their basic bid price for a click. Once the dynamic link platform 150 has a basic price for this click, dynamic link platform 150 determines the amount of the participant's budget that still remains. If they are spending money more quickly than the time gone by in the month (e.g., they have spent 50% of the budget with only 25% of the days of the month gone past) the participant's bid can be adjusted down. This enables participants to budget their funds over time (e.g., to more evenly disperse their budget over a period of time, and/or to target more profitable opportunities in the future).

In some cases, once the dynamic link platform 150 has received a bid from the auction participants, the dynamic link platform 150 can compare the bids to allocate "win percentages." The win percentages can be determined such that all of the auction's participants win some percentage of the clicks. As an example, given a bid of $0.50 and a bid of $0.10, the $0.50 bidder can win ⅚ of the time, and the $0.10 bidder can win ⅙ of the time. In some cases, the dynamic link platform 150 can record data regarding auction results over time (e.g., the number and/or percentage of times that each user wins an auction given particular bids). This enables the dynamic link platform 150 to grow more accurate over time.

Further, the dynamic link platform 150 can also select winners based on the remaining budgets of each of the auction participants. For example, the dynamic link platform 150 can balancing the bids, such that the percentage of each participant's remaining budget is used to adjust the effective bid price for the participant. As an example, bids from a participant having a higher remaining budget can be weighted more highly, such that the participant is more likely to win an auction. This can be beneficial, for example, as it enables participants bidders who are having trouble spending their budget to win more often than they otherwise would. Further, this enables participants who have fewer opportunities still get a chance to spend their budget instead of being crowded out by other participants with more opportunities but not enough budget to utilize them all.

In some cases, the dynamic link platform can choose a destination page, for instance, from a collection of candidate destination pages, based on other factors, such as a popularity of the destination page and/or the relevance of the destination page. For example, if a particular destination page is more popular than others (e.g., the destination page receives more visitors over a period of time than other destination pages), the dynamic link platform 150 can favor that destination page over the other destination pages.

In some cases, the destination page may be chosen based on factors relevant to the reader who has accessed the link. For instance, the destination may be chosen based on a browsing history of a user profile associated with the browser used to access the dynamic link, a purchase history, or other consumer-specific factors. As an example, if the reader frequently visits a destination pages associated with a particular merchant over destination pages of other merchants, the dynamic link platform 150 can choose the destination page associated with the particular merchant. In some cases, a user's browsing history and/or purchase history can be obtained using "conversion pixels" to track a user's activities on one or more webpages. For example, a webpage can include a sequence of code that is executed when a user access the webpage and/or performs particular actions with respect to the webpage. Upon execution of the sequence of code, the user's device can transmit a message to the dynamic link platform 150 regarding the access and/or performed action.

In some cases, the dynamic link platform can choose a destination page based on one or more criteria specified by the content provider. For instance, a content provider can specify one or more candidate merchants from which the dynamic link platform 150 can choose a destination. This can be useful, as it enables the content provider to control which external content is associated with her content.

In some cases, the dynamic link platform can choose a destination page based on characteristics of each of the candidate destination pages. For example, if content cannot be retrieved from a candidate destination page (e.g., candidate webpage no longer exists or a particular item, such as a product for sale, text, image, link to a video file, or link to an audio file is no longer available at the candidate destination page), the candidate destination page can be excluded from consideration. For instance, the dynamic link platform can remove that particular destination page from the list of candidate destination pages. In some cases, the dynamic link platform 150 can determine whether content can be retrieved from the candidate destination page by attempting to scrape the candidate webpage (or receiving scraped information from another device) and determining whether content could be successfully retrieved. As another example, if a particular candidate destination page is a webpage offering a product for sale, but the product is no longer in stock at that candidate destination page, the dynamic link platform can remove that page can be excluded from consideration, or deprioritized during the selection process. In some cases, the dynamic link platform 150 can determine whether a product is for sale and/or in stock by scraping a webpage (or receiving scraped information from another device) and identifying keywords and/or patterns on the webpage.

In some cases, multiple different criteria can be considered in selecting a link. For example, an electronic auction can be used to choose a destination, though the winner of the electronic auction need not necessarily be chosen as the destination page. Instead, the dynamic link platform 150 can additional consider one or more other weighting factors in choosing the destination page (e.g., the popularity of the destination, the relevance of the destination page, characteristics of the reader, characteristics of the candidate destination pages, criteria specified by the content provider, and/or other factors).

In some cases, in response to receiving an access request from a reader, the dynamic link platform 150 can initially retrieve all of the candidate destination pages from the index and mark the entities associated with those candidate destination pages as participants in an auction. If an entity has a pre-arranged agreement (e.g., a fixed price/destination agreement), then the agreement can be enforced at that time. For example, the entity that controls a candidate destination page may be willing to pay a fee to ensure that all click traffic on a particular dynamic link or set of dynamic links is directed to their webpages. For instance, a particular merchant may wish to pay extra to guarantee that all dynamic links from a specific publisher are redirected to the merchant's webpages.

Further, the dynamic link platform 150 can also filter one or more entities from the auction (e.g., one or more entities that have been excluded by the content provider, or are otherwise not eligible to bid).

Further, the dynamic link platform 150 can also categorize one or more entities with respect to the auction based on the accessibility of their respective candidate destination page. For example, entities associated with "active" candidate destination pages (e.g., webpages that are accessible, and advertise a particular in-stock product for sale), can be allowed to bid. Further, entities associated with "inactive" or "fallback" candidate destination pages can be allowed to bid as deprioritized bidders. An inactive or fallback page can be, for instance, a candidate destination page that is less preferable due to particular characteristics of the candidate destination page, but are still eligible for selection as the destination page if a more suitable selection cannot be made. As an example, a fallback page can be a webpage that is accessible and advertises a particular product for sale, but indicates that the product in not in stock. Further, entities associated with invalid candidate destination pages (e.g., webpages that are no longer available because the page does not load or is now directed to different content) can be excluded from the auction. Such inactive pages are a common source of what is known as "link rot," which is sometimes referred to as the process where hyperlinks point to destination pages, servers or other resources that have become essentially permanently unavailable. Link rot can be caused by, for instance, websites that are restructured or redesigned, websites that are moved behind paywalls, firewalls or other filters, content being removed, the website is closed or taken down, or the website has changed its domain name, among other causes. An advantage of the dynamic link platforms of the present disclosure is that, in certain implementations, the platforms enable content providers to keep link destinations up-to-date and pointing to active and relevant webpages automatically, without requiring the content providers to manually review and reconfigure links that may be associated with inactive webpages. Thus, requests to access webpages are less likely to fail, thereby improving the efficiency and performance of a communications network. For instance, in some cases, up to about 30% of product advertising links within an online magazine may become inactive. Accordingly, in such an example, the dynamic links of the present disclosure can improve link effectiveness by about 30%.

Upon commencement of the auction, each participant having an active candidate destination page has the option to place a bid. Further, each participant having an inactive "fallback" candidate destination page also has the option to place a bid.

The dynamic link platform 150 can choose a destination page based, at least in part, on these bids. For example, the dynamic link platform 150 can choose a destination page associated with a participant having the highest bid.

If none of the participants submitted a valid bid, the dynamic link platform 150 can randomly choose a destination page from among the active candidate destination pages. If no candidate destination pages are active, a destination page can be chosen from among the inactive or "fallback" candidate destination pages.

If a suitable candidate destination page cannot be found (e.g., there are no eligible bidders), the original destination page proposed by the content provider can be chosen as the destination page.

After a destination page is chosen, the dynamic link platform 150 redirects the access request to the chosen destination page (step 322). For example, the dynamic link platform 150 can provide a network address (e.g., a URL) identifying the chosen destination page to the client system 102b. In some cases, the redirection can be performed using a HTTP redirection command.

In response, the client system 102b retrieves content from the chosen destination page (step 324). In some cases, the dynamic link platform 150 can cause the client system 102b to automatically retrieve the contents of the chosen destination page, such that the reader is seamlessly redirected to the destination page. In some cases, the role of the dynamic link platform 150 in choosing a destination page need not be advertised to the reader. For example, to the reader, it may appear that the dynamic link operates in a similar manner as a static link.

In some cases, the dynamic link platform 150 can track a reader's interactions with the destination page. For example, if the destination page is a webpage on a merchant's website, the dynamic link platform 150 can track how long the reader's web browser was displaying the webpage and/or the merchant's website, the number and/or identity of items added to the reader's "shopping cart" on the website, the number and/or identity of items that the reader purchased, the price of any items that were purchased, and so forth. In some cases, to avoid associating long periods of inactivity with the reader's behavior, the dynamic link platform 150 might track time at a webpage only when certain activities (e.g., scrolling, clicking, etc.) are being conducted within a certain time frame. This can be useful, for example, in excluding periods of time in which the reader is not paying attention to the content of the webpage.

In some cases, the dynamic link platform 150 can record the number of times that each dynamic link is accessed by users, and the number of purchases made on a selected destination page sites by users who selected the dynamic link. Based on these numbers, the dynamic link platform 150 can estimate the average amount spent per click on the retailer site (e.g., by dividing the amount spent by users in connection with a link by the number of times that the link was accessed). Further, the dynamic link platform 150 can categorize access requests by demographics, content provide webpages, destination webpages, and/or individual user history to ascertain behavior patterns of users in particular situations or conditions. This can be useful, for example, in estimating the behavior of a user or group of users.

This information can be retained by the dynamic link platform 150, and used to generate a behavioral profile for each reader. This can be useful, for example, in projecting future "click values" associated with that reader or similar types of readers (e.g., an estimated rate of return for bids with respect to that reader, or readers with similar behavioral characteristics), which may assist bidders in refining their bidding strategy in auctions in the future.

In some cases, a new auction can be conducted each time the dynamic link is selected by a user. This can be beneficial, for example, as it enables each participant an opportunity to be selected as the destination with each new access request by a reader. Further, this enables each participant to selectively bid on as many or as few access requests as desired, and provides each participant with substantial flexibility during the bidding process.

FIGS. 4A-4D show example user interfaces for generating and using dynamic links.

Figure 4A:
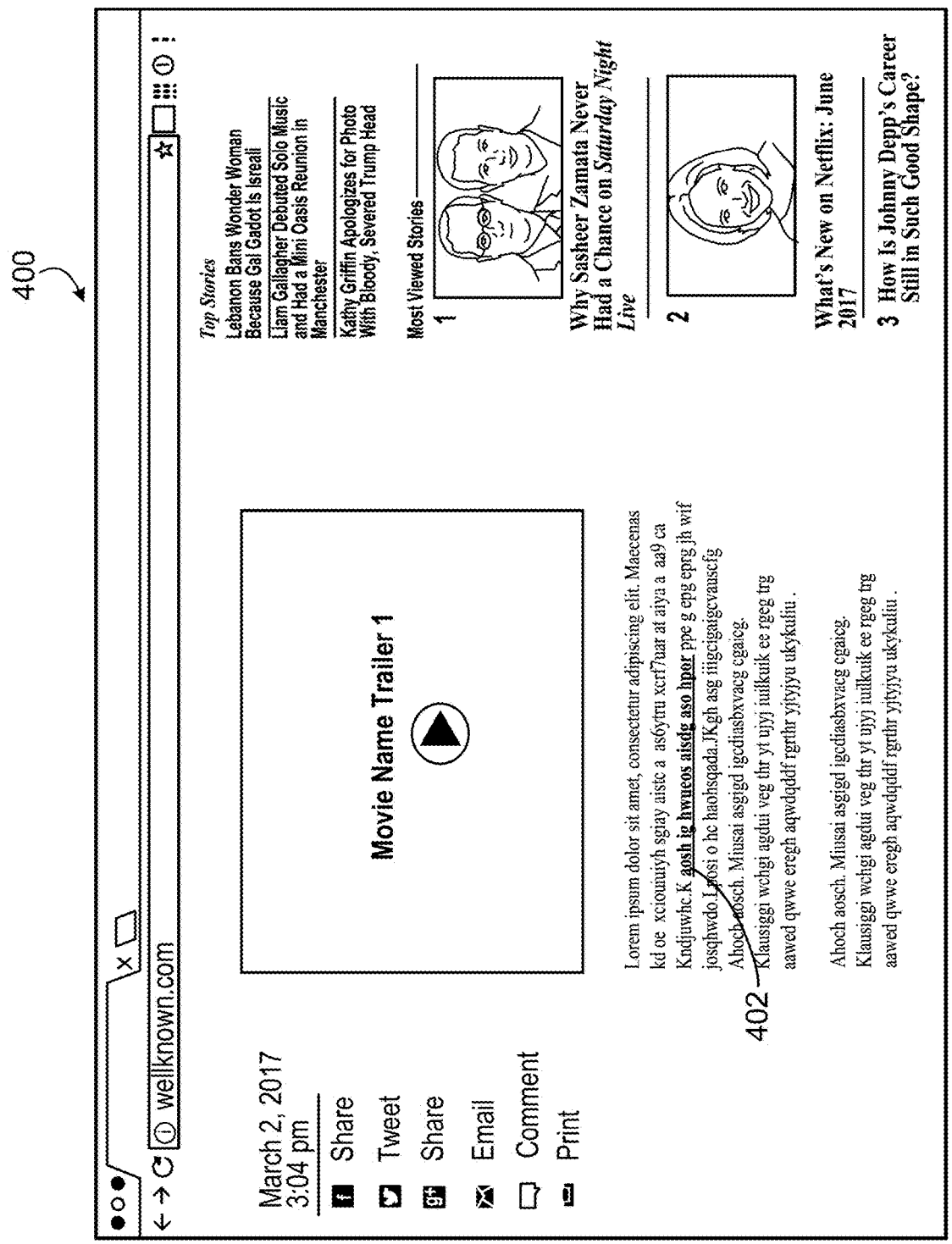

FIG. 4A shows a screenshot 400 of a web browser displaying example content on a content provider's website (e.g., a digital article published by the content provider "Well Known Publisher"). The content includes a dynamic link 402. A user can select the dynamic link 402 to access a destination page. For instance, a user can click on the dynamic link 402 using an input device, and in response, his web browser can be directed to a corresponding destination page. As described herein, the destination page can be selected by the dynamic link platform 150 based on input provided by the content provider and/or other selection criteria.

Figure 4B:
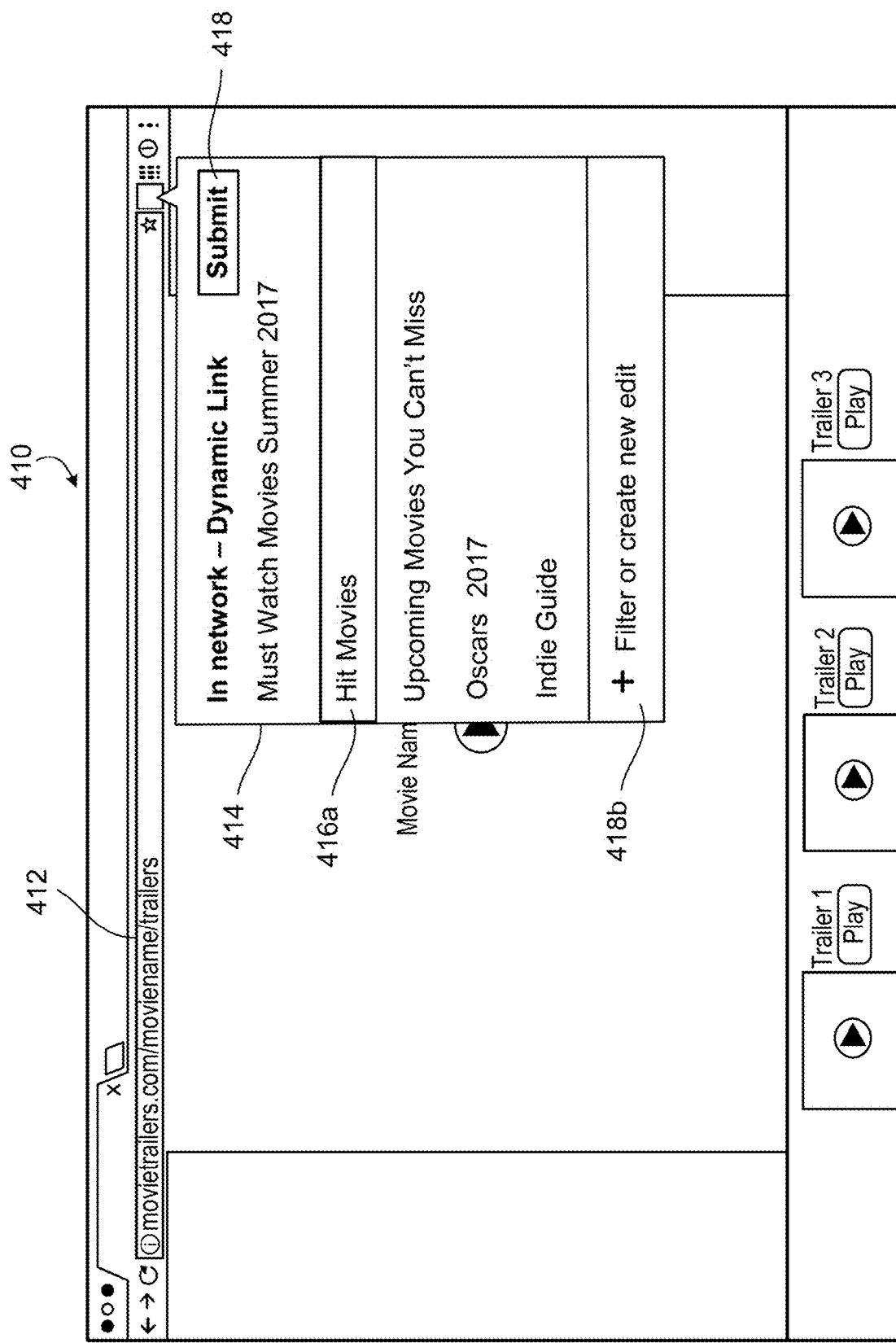

As described herein, a content provider can create a dynamic link by providing a proposed candidate page to the dynamic link platform 150. As an example, FIG. 4B shows a screenshot 410 of a web browser displaying a proposed candidate page selected by a content provider (indicated by a URL 412). In this example, the content provider wishes to create a dynamic link regarding a movie, and has navigated his web browser to a proposed candidate page showing several trailers for the movie. Using a user interface 414, the content provider selects a label 416a to identify the dynamic link (e.g., "Hit Movies"), and selects a command 418 to create the dynamic link (e.g., "Submit"). Alternatively, the content provider can create a new label to identify the dynamic link (e.g., by selecting the "+ Filter or create new edit" command 416b and inputting a new label), and selecting the command 418. In some cases, the commands can be provided by a web browser extension or add-on. For instance, the user interface 414 and its associated functionality can be provided by a web browser extension or add-on.

Figure 4C:
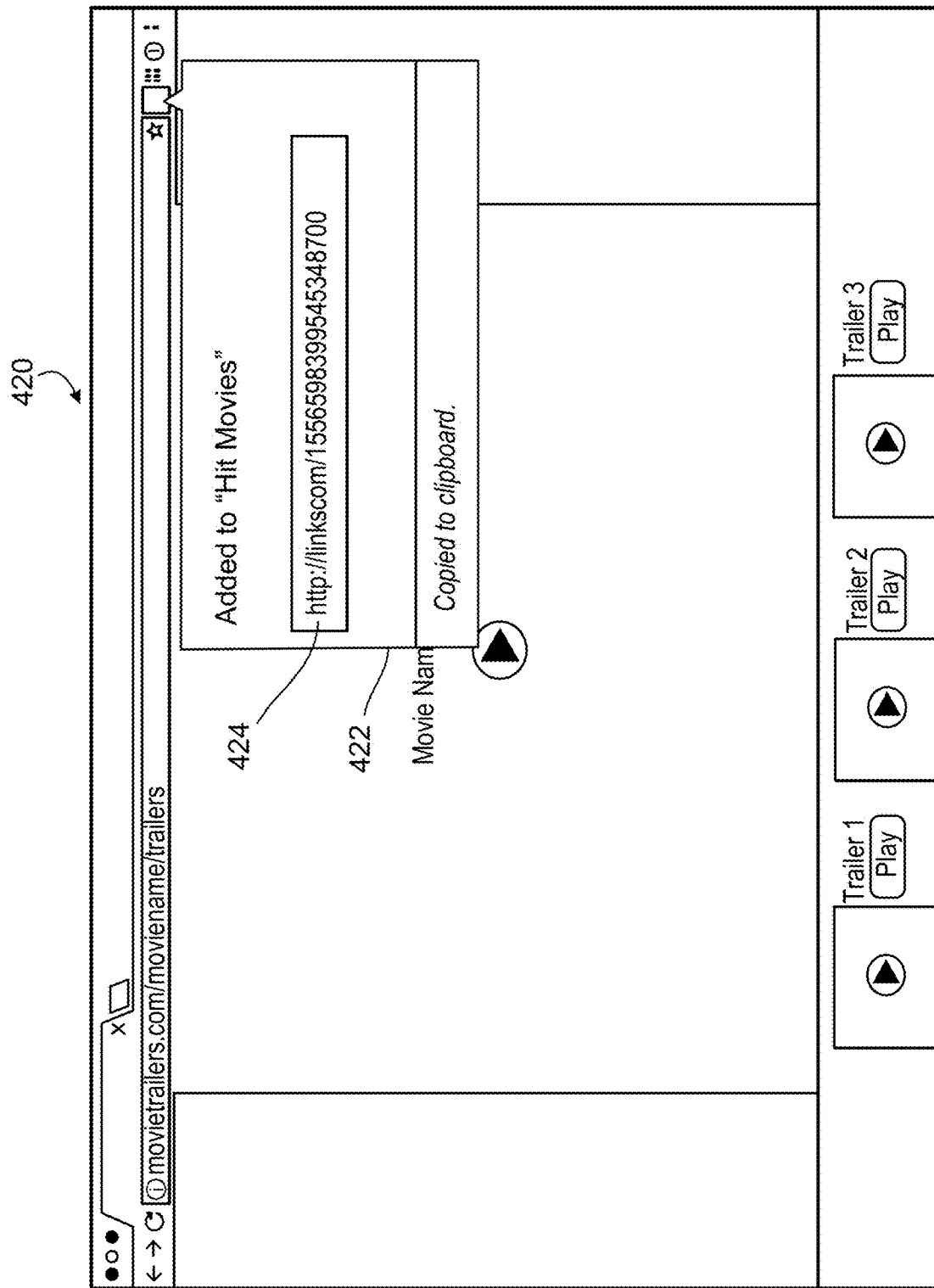

The dynamic link platform 150 generates a dynamic link based on the content provider's selection. For example, FIG. 4C shows a screenshot 420 of a web browser displaying a generated dynamic link 422 in a user interface 424. In this example, the dynamic link 422 includes a URL with an identifier ("1556598399545348700") that uniquely identifies the dynamic link. The content provider can incorporate the dynamic link 422 into content (e.g., by including the URL in the source code of a web page) to publish the dynamic link. In some cases, the dynamic link can be provided by a web browser extension or add-on. For instance, the user interface 422 and its associated functionality can be provided by a web-browser extension or add-on.

In some cases, a link associated with technology different than the those generated by the systems disclosed herein requires information (e.g., images, text or other data) to be ported from a server into the web page that hosts the link. Additionally, in some cases, links associated with technology different than those generated by the systems disclosed herein require loading tags (e.g., javascript tags) that run in the background of the page hosting the link, and which decide what data (e.g., what advertisement) to display. In contrast, with the links generated according to the present disclosure, there is no need to port data into the web page. Nor is there a requirement to load tags that run in the background. Rather, as described herein, the link notifies the dynamic link platform 150 only upon being accessed by the user. Accordingly, by not requiring data to be ported into a web page upon loading a link, or requiring tags to run in the background, both the latency of page loading and the memory required to display a webpage can be reduced.

As described herein, the dynamic link platform 150 can identify one or more additional candidate pages based on the candidate page proposed by the content provider. Each of these candidate pages can be displayed to the content provider. As an example, FIG. 4D shows a screenshot 430 of a user interface 436 displaying several candidate pages. In this example, the destination proposed by the content provider is shown on the left-hand side 432 of the user interface 436. A list of additional candidate destination pages identified by the dynamic link platform 150 is shown on the right-hand side 434 of the user interface 436.

Figure 4E:

As described herein, a content provider can create and manage an account on the dynamic link platform 150. For example, FIG. 4E shows a screenshot 440 of a user interface 444 that enables a content provider to manage their account preferences. On the right-hand side 442 of the user interface 444, the content provider can control which candidate destination pages that it wants to be "matched" or selected for his dynamic links. By un-checking the check mark next to the listed candidate destination pages, a content provider can exclude particular candidate destination pages from being matched to his dynamic links. In this example, the content provider has excluded, amongst others, "Trailer Site 1." In some cases, the commands can be provided by the dynamic link platform 150. For instance, the user interface 444 and its associated functionality can be provided by the dynamic link platform 150 in the form of an interactive web page or "web app."

Figure 4F:
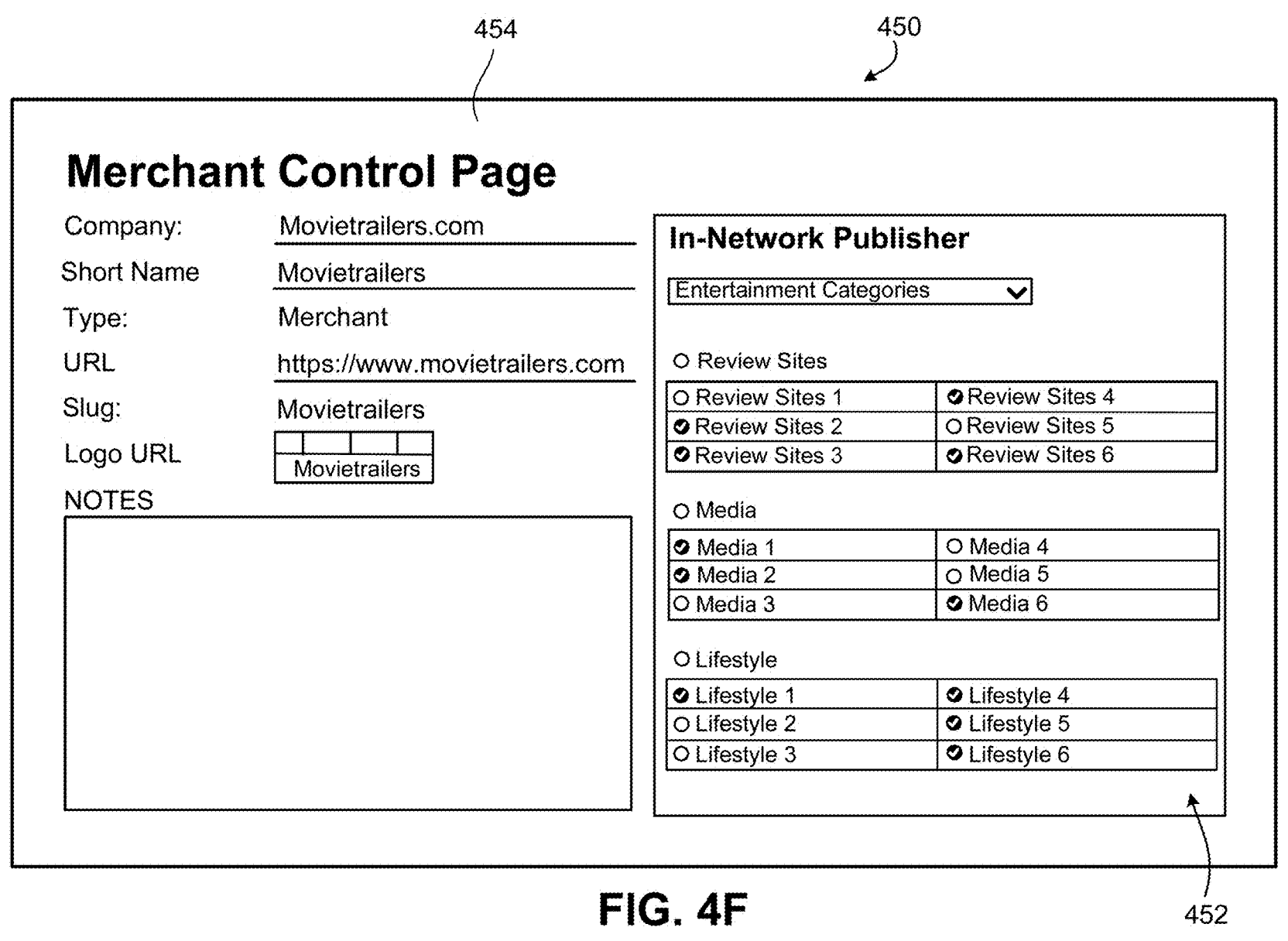

As described herein, entities vying to be selected as a candidate (e.g., "outbound entities" or merchants) can also create and maintain accounts on the dynamic link platform 150. For example, FIG. 4F shows a screenshot 450 of a management user interface 454 that enables an outbound entity or merchant entity to manage their account preferences. On the right-hand side 452 of the manage user interface 454, the outbound entity or merchant is able to control which content provider websites it wants to be linked to. By un-checking the check mark next to the listed content provider websites, an outbound entity or merchant is able to exclude particular content providers from linking to their sites. Accordingly, the dynamic link platform 150 will not select the outbound entity's or merchant's webpage as a destination page for that content provider's dynamic links. In this example, the outbound entity or merchant has excluded, amongst others, "Review Site 1." In some cases, the commands can be provided by the dynamic link platform 150. For instance, the user interface 454 and its associated functionality can be provided by the dynamic link platform 150 in the form of an interactive web page or "web app."

In the examples described above (e.g., as described with respect to FIG. 3), a candidate destination is selected "on click." For instance, a publisher can generate a dynamic link (e.g., by submitting a request from a client system 102a and to a dynamic link platform 150), and insert the generated dynamic link into published content (e.g., a web page). When a user accesses the published content using his browser (e.g., running on the client system 102b) and selects a dynamic link (e.g., "clicks" on the dynamic link), the user's browser is directed to a dynamic link platform (e.g., the dynamic link platform 150). The dynamic link platform selects a destination from among a number of candidate destinations (e.g., by conducting an auction), and redirects the user's browser to the selected destination. Thus, a destination page is selected by the dynamic link platform when the user selects or "clicks" a dynamic link. An example of this process is shown, for example, in FIG. 3.

However, in some cases, a candidate destination can be selected "on impression." For example, a publisher can insert executable code into published content (e.g., include a portion of JavaScript code in the markup of a web page). Further, the publisher can include a "traditional" static link in the published content (e.g., include a static link identifying a particular proposed destination web page). When a user accesses the published content using his browser, the browser automatically executes the executable code (e.g., upon loading of the web page). Upon execution of the executable code, the user's browser identifies the static link in the published content, and transmits the static link to the dynamic link platform (e.g., the dynamic link platform 150). The dynamic link platform retrieves content from the destination identified by the static link, determines one or more candidate destinations, and selects a destination from among the candidate destinations (e.g., in a similar amend as described above). Upon selecting a destination, the dynamic link transmits the address of the selected destination to the user's browser. Upon receiving the selected destination, the user's browser automatically replaces the static link with a new link identifying the selected destination, without requiring any action on the part of the user. When the user selects the new link, the user is directed to the selected destination. Thus, a destination page is selected by the dynamic link platform when the user first accesses the published content (e.g., "on impression" of the published content), rather than when the user selects or "clicks" on a particular link.

In some cases, the executable code can replace multiple static links on a single piece of published content. For example, upon execution of the executable code, the user's browser can identify multiple static links in the published content, and transmit each static link to the dynamic link platform. The dynamic link platform can retrieve content from each of the destinations identified by the static links, determines one or more candidate destinations for each static link, and selects a destination from among the candidate destinations for each static link. Upon selecting the destinations, the dynamic link can transmit the addresses of the selected destinations to the user's browser. Upon receiving the selected destinations, the user's browser automatically replaces each of the static link with a respective a new link identifying the corresponding selected destination, without requiring any action on the part of the user.

This can be useful, for example, and it enables a publisher to harness the automatic destination selection features of the dynamic link platform, without requiring that the publisher manually generate dynamic links for each and every piece of published content. Instead, the publisher can insert a common piece of executable code into each piece of published content. Upon execution by a user's browser, the executable code automatically triggers the functionality of the dynamic link platform, and automatically replaces static links with links to new destinations selected by the dynamic link platform.

In some cases, the executable code can be configured such that only particular types of links are automatically replaced in this manner. For example, the executable code can operate according to "white list" specifying which types of static links can be automatically replaced (e.g., a white list identifying particular web domains eligible for automatic replacement). Upon execution of the executable code, a user's browser can identify each of the static links in the published content, and automatically replace only the static links specified by the white list. The white list can be maintained, for example, by the publisher of the published content and/or the administrators of the dynamic link platform.

In some cases, a candidate destination for a dynamic link also can be selected "on impression." For instance, a publisher can generate a dynamic link, and insert the generated dynamic link into published content (e.g., in a similar manner as described above). The publisher can also insert executable code into the published content (e.g., in a similar manner as described above). When a user accesses the published content using his browser, the browser automatically executes the executable code. Upon execution of the executable code, the user's browser identifies the dynamic link in the published content, and transmits the dynamic link to the dynamic link platform. In response, the dynamic link platform selects a destination from among one or more candidate destinations (e.g., in a similar amend as described above). Upon selecting a destination, the dynamic link transmits the address of the selected destination to the user's browser. Upon receiving the selected destination, the user's browser automatically replaces the dynamic link with a new link identifying the selected destination, without requiring any action on the part of the user. When the user selects the new link, the user is directed to the selected destination. Thus, a destination page is selected by the dynamic link platform when the user first accesses the published content (e.g., "on impression" of the published content), rather than when the user selects or "clicks" on a particular link.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the server system 104, the platform 150, and the client systems 102*a-b* can be implemented using digital electronic circuitry, or in computer software, firmware, or hardware, or in combinations of one or more of them. In another example, the process 300 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 5:
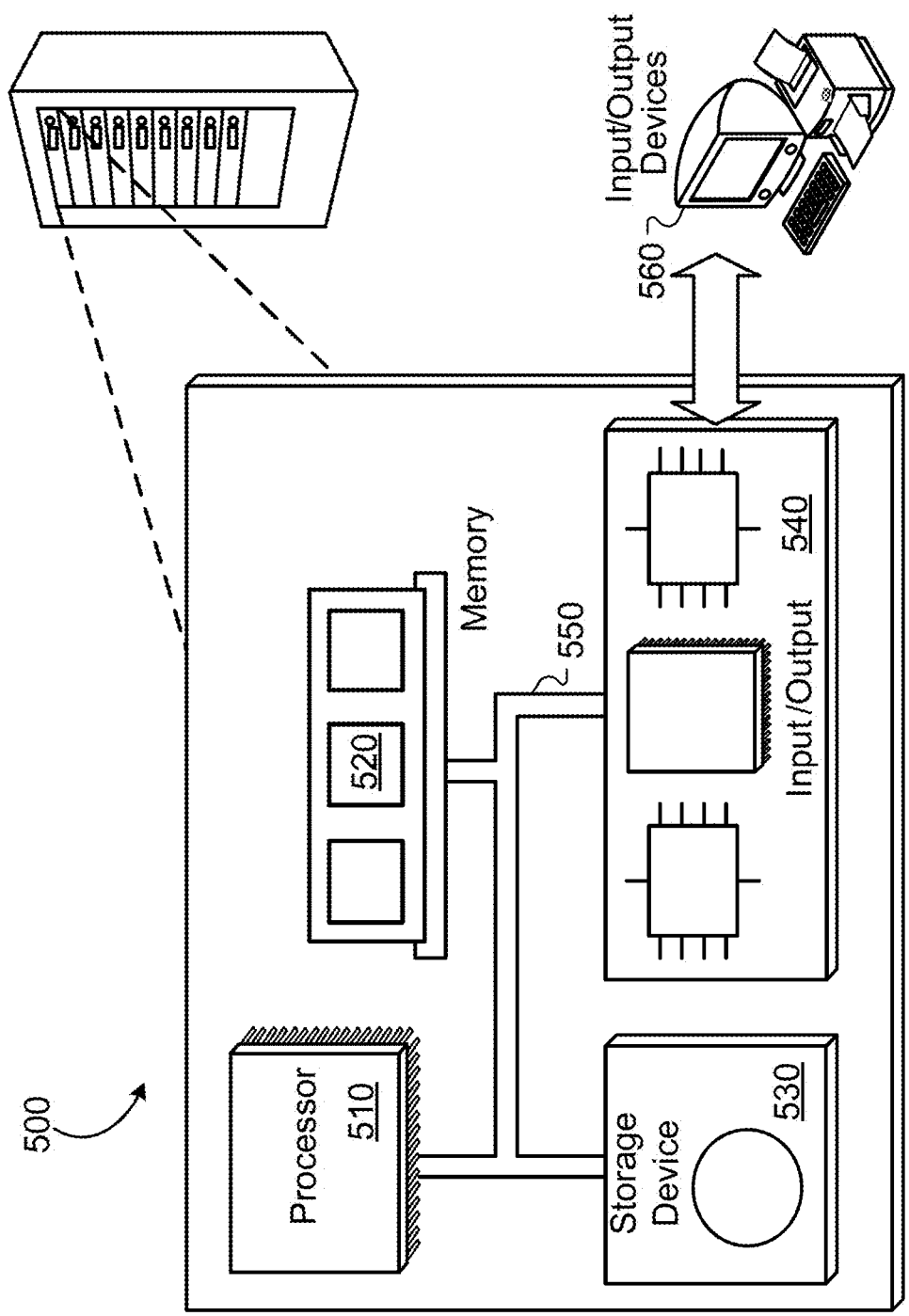
FIG. 5 is a diagram of an example computer system

FIG. 5 shows an example computer system 500 that includes a processor 510, a memory 520, a storage device 530 and an input/output device 540. Each of the components 510, 520, 530 and 540 can be interconnected, for example, by a system bus 550. The processor 510 is capable of processing instructions for execution within the system 500. In some implementations, the processor 510 is a single-threaded processor, a multi-threaded processor, or another type of processor. The processor 510 is capable of processing instructions stored in the memory 520 or on the storage device 530. The memory 520 and the storage device 530 can store information within the system 500.

The input/output device 540 provides input/output operations for the system 500. In some implementations, the input/output device 540 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 560. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of implementations have been described. Nevertheless, it will be understood that various modifications may be made without departing from the spirit and scope of the invention. Accordingly, other implementations are within the scope of the following claims.

What is claimed is:

1. A method comprising:
   receiving, from a first device, a request for a dynamic access link, wherein the request comprises data identifying a first network resource;
   identifying a subject associated with the first network resource;
   determining one or more additional network resources pertaining to the subject;
   generating the dynamic access link and providing the dynamic access link to the first device;
   receiving, from a second device, a network resource access request, wherein the network resource access request is generated responsive to the dynamic access link being selected;
   responsive to receiving the network resource access request, choosing at least one of the first resource or the one or more additional network resources; and
   providing a network address of the chosen resource to the second device.

2. The method of claim 1, wherein the first network resource is a webpage, and wherein the subject is a product.

3. The method of claim 1, wherein choosing at least one of the first network resource or the one or more additional network resources comprises:
   receiving one or more bids from one or more entities associated with the first network resource or the one or more additional network resources; and
   choosing at least one of the first network resource or the one or more additional network resources based on the one or more bids.

4. The method of claim 3, wherein the one or more bids are received subsequent to generating the dynamic access link and providing the dynamic access link to the first device.

5. The method of claim 4, wherein the one or more bids are received prior to receiving the network resource access request from the second device.

6. The method of claim 1, wherein the dynamic access link is a uniform resource locator.

7. The method of claim 6, wherein the dynamic access link comprises a first sequence of alphanumeric characters common to one or more additional dynamic access links, and a second sequence of alphanumeric characters unique to the dynamic access link with respect to the one or more additional dynamic access links.

8. The method of claim 7, further comprising storing, in an electronic database, the second sequence of alphanumeric characters, an indication of the subject, and an indication of an association between the second sequence of alphanumeric characters and the subject.

9. The method of claim 1, wherein the subject is a product, and
   the method further comprising:
   determining one or more characteristics of the product based on the first network resource, and
   storing, in the electronic database, the one or more characteristics of the product.

10. The method of claim 9, wherein the one or more characteristics of the product comprise a product specification associated with the product.

11. The method of claim 1, wherein choosing at least one of the first network resource or the one or more additional network resources comprises:
    determining an absence of a valid bid from entities associated with the first network resource or the one or more additional network resources with respect to the dynamic access link; and
    responsive to determining the absence of a valid bid, randomly choosing at least one of the first network resource or the one or more additional network resources.

12. The method of claim 1, wherein choosing at least one of the first network resource or the one or more additional network resources comprises:
    determining that at least one of:
      the first network resource is unavailable,
      at least one of the one or more additional network resources is unavailable,
      content from the first network resource is unavailable, or
      content from at least one of the one or more additional network resource is unavailable; and
    choosing at least one of the first network resource or the one or more additional network resources in based on determining that at least one of the first network resource is unavailable, at least one of the one or more additional network resources is unavailable, content from the first network resource is unavailable, or content from at least one of the one or more additional network resource is unavailable.

13. The method of claim 12, wherein determining that at least one of the first network resource is unavailable, at least one of the one or more additional network resources is unavailable, content from the first network resource is unavailable, or content from at least one of the one or more additional network resource is unavailable comprises:

determining that a particular network resources cannot be accessed through a communications network using, and wherein choosing at least one of the first network resource or the one or more additional network resources comprises excluding the particular webpage from being chosen.

14. The method of claim 1, wherein the request for the dynamic access link is generated by a browser extension application of the first device.

15. The method of claim 14, wherein the request for the dynamic access link is generated by the browser extension application of the first device responsive to a user retrieving the first network resource using a browser of the first device and inputting a command to generate the request to the browser extension application.

16. The method of claim 1 wherein the first network resource comprises a sales offer for a product, and wherein the one or more additional network resources comprise one or more additional webpages, and wherein each additional webpage comprises a respective sales offer for the product.

17. The method of claim 16, wherein choosing at least one of the first network resource or the one or more additional network resources comprises:

determining, based on the webpage and the one or more additional webpages, an availability of the product from one or more entities associated with the first network resource or the one or more additional network resources; and choosing at least one of the first network resource or the one or more additional network resources based on the determined availability of the product.

18. The method of claim 17, wherein determining the availability of the product comprises determining that the product is unavailable from a particular entity associated with the first network resource or the one or more additional network resources, and wherein choosing at least one of the first network resource or the one or more additional network resources comprises excluding the first network resource or the one or more additional network resources associated with the particular entity from being chosen.

19. A non-transitory computer-readable medium including one or more sequences of instructions which, when executed by one or more processors, causes:

receiving, from a first device, a request for a dynamic access link, wherein the request comprises data identifying a first network resource;

identifying a subject associated with the first network resource;

determining one or more additional network resources pertaining to the subject;

generating the dynamic access link and providing the dynamic access link to the first device;

receiving, from a second device, a network resource access request, wherein the network resource access request is generated responsive to the dynamic access link being selected;

responsive to receiving the network resource access request, choosing at least one of the first resource or the one or more additional network resources; and providing a network address of the chosen resource to the second device.

20. A system comprising:

one or more processors; and a non-transitory computer-readable medium including one or more sequences of instructions which, when executed by the one or more processes, causes:

receiving, from a first device, a request for a dynamic access link, wherein the request comprises data identifying a first network resource;

identifying a subject associated with the first network resource;

determining one or more additional network resources pertaining to the subject;

generating the dynamic access link and providing the dynamic access link to the first device;

receiving, from a second device, a network resource access request, wherein the network resource access request is generated responsive to the dynamic access link being selected;

responsive to receiving the network resource access request, choosing at least one of the first resource or the one or more additional network resources; and providing a network address of the chosen resource to the second device.

* * * * *